Aug. 7, 1934.　　　　A. O. GROOMS　　　　1,969,304
REFRIGERATOR CONTROL
Filed July 7, 1933
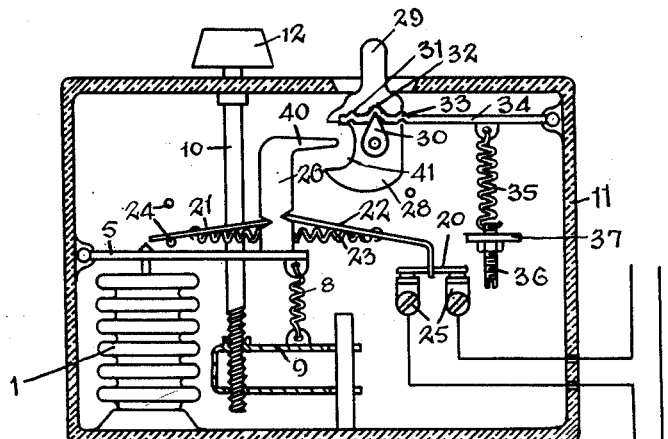
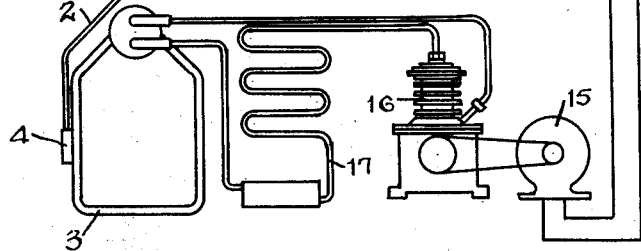
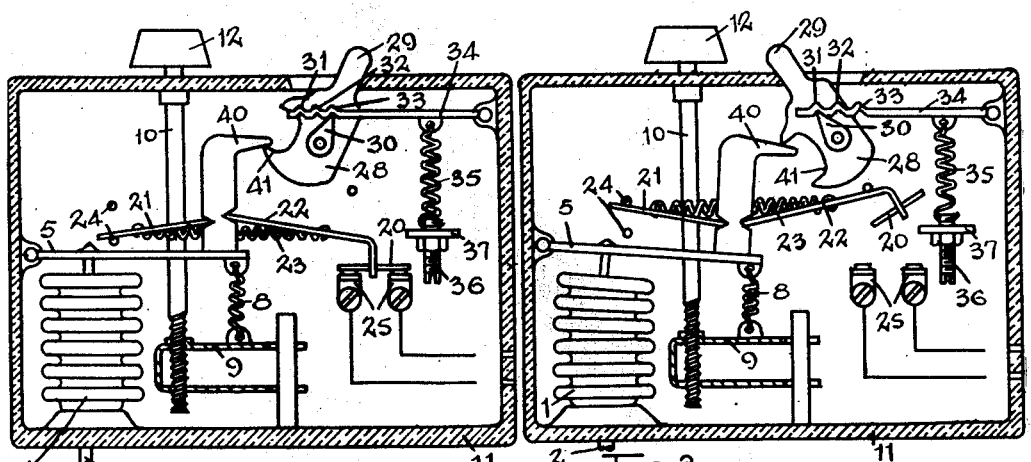

Patented Aug. 7, 1934

1,969,304

UNITED STATES PATENT OFFICE

1,969,304

REFRIGERATOR CONTROL

Albert Oakley Grooms, Columbus, Ohio, assignor to The Automatic Reclosing Circuit Breaker Company, Columbus, Ohio Application July 7, 1933, Serial No. 679,403

15 Claims. (Cl. 200—83)

My invention has for its object to provide a control device for refrigerating apparatus wherein the normal or ordinary refrigerating temperatures produced in the cooling unit of the apparatus may be modified to produce either a fast freezing or a defrosting temperature, and wherein upon attainment of either the fast freezing or defrosting temperatures, the normal refrigerating temperatures are automatically re-established in the cooling unit.

More specifically, the object of my invention is to provide a thermo-responsive switch for controlling the operation of the motor of an electrically powered refrigerating apparatus wherein two temperature control members are provided, one of which may be manipulated to produce desired normal refrigerating temperature cycles, and the second to produce either a fast freezing or a defrosting cycle in the cooling unit of the refrigerating system. I have also provided means whereby the fast freezing and defrosting cycles initiated by the second control member may be automatically terminated and the refrigerating apparatus caused to again produce the normal refrigerating cycles according to the adjustment of the first member.

The first control member is provided so that the operator of the thermostat may adjust within certain limits the temperatures at which the refrigerator motor is started and stopped to produce certain desired temperatures in the cooling unit of the refrigerating apparatus. The second control member enables the production of a prolonged operation of the refrigerating apparatus to produce a fast freezing temperature in the cooling unit, or a suspended operation of the refrigerating apparatus to cause defrosting of the cooling unit and, upon production of the fast freezing temperature or the defrosting temperature, the control member is automatically returned to its original or normal position from which it is moved by the operator to produce the fast freezing or defrosting.

As is well known, ice and frost form on the cooling unit of refrigerating apparatus during its operation and heretofore it has been customary to completely shut off the compressor or else adjust the thermostat to produce a temperature above the melting point of ice to enable the cooling unit to defrost or to prevent the collection of ice and frost thereon. These methods of defrosting, however, necessitate manual reclosing of the refrigerator motor switch or resetting of the control device after the ice has melted from the cooling unit to prevent spoiling of the food in the food chamber of the refrigerator due to a rise in temperature that may approximate atmospheric temperatures. It is also often found desirable to produce an excessive cold temperature in the cooling unit in order to freeze ice cubes, meats or various other foodstuffs rapidly and while this may be accomplished by the adjustment of the control devices heretofore used, such adjustment is frequently left unintentionally for long periods of time since it necessitates a manual resetting of the control device to cause a return to the normal operating condition of the refrigerator.

By my invention I have provided a means in a refrigerator thermostat whereby either a fast freezing or a defrosting temperature may be readily produced in the cooling unit without disturbing the adjustment of the normal refrigerating temperatures, and I have also provided means whereby production of the desired normal refrigerating temperatures is automatically restored to the cooling unit upon completion of the fast freezing or defrosting operations of the refrigerating apparatus.

The invention may be contained in control devices of different forms, and to illustrate a practical application of the invention, I have selected a control device containing the invention as an example of the various structures that embody the invention, and shall describe the control device selected hereinafter. The particular control device referred to is illustrated in the accompanying drawing.

Fig. 1 illustrates the control device and a refrigerating apparatus in connection with which the control device may be used, the parts of the control device being shown in a normal operating position. Fig. 2 illustrates the control device shown in Fig. 1, the parts, however, being shown in position to produce fast freezing of the cooling unit of the refrigerating apparatus. Fig. 3 illustrates the control device wherein the parts are shown in positions to cause the cooling unit to defrost.

In the form of control device shown in the drawing, a heat responsive element, comprising a bellows 1 connected to a tube 2 that terminates in a bulb 4 placed in thermal contact with the cooling unit or evaporator 3, is filled with a volatile gas so that a gas pressure will be produced in the bellows that varies substantially according to the temperature variations in the cooling unit. However, the tube 2 may be connected directly to the cooling unit so that the pressures in the bellows will correspond to the pressures of the refrigerant within the cooling unit, and since, as is well known, the refrigerant pressure in the evaporator varies in accordance with the temperature of the evaporator, the bellows will expand and contract with the changes in temperatures of the cooling unit.

The bellows is adapted to engage a lever 5 so as to raise and lower the lever as the bellows changes in volume. The movement of the lever 5 by the expansion of the bellows 1, is resisted by a suitable tension spring 8 which is connected to the lever at one end and to a means for adjusting the tension of the spring at the other end. Thus, the lever 5 is moved according to the internal pressure of the bellows as modified by the tension of the spring 8.

The spring 8, and consequently, its resistance to the expansive movement of the bellows, is adjusted by means of a plate 9 through which a rod 10 extends, the rod and the plate being threaded to cause movement of the plate to increase or decrease the tension of the spring when the rod is rotated. The rod 10 preferably protrudes through the wall of the shell 11 in which the parts of the controlling device are housed, and may be rotated by an adjusting member 12 connected to the rod.

In the form of construction shown, the movement of the lever 5, in response to the movement of the bellows 1, operates a suitable switch to open and close the circuit of the electric motor 15. The motor 15 thus periodically operates a compressor 16 which compresses and directs a refrigerant fluid to a condenser 17 where the refrigerant is condensed. From the condenser, the refrigerant enters the evaporator or cooling unit 3 in controlled amounts and from which it is drawn by the operations of the compressor 16.

Preferably, the switch is a snap switch and the movable element of the switch is mounted on the lever 5. A movable contact 20 is carried by the member 22 that is pivotally supported on the lever 5, and is connected by a spring 23 to a similar member 21 that is also pivotally supported on the lever 5 and which cooperates with the member 22 to move the contact 20 to and from the fixed contacts 25 with a snap action. The members 21 and 22 are preferably made U shaped, having their open ends engaged in notches formed in a yoke 26 supported on the lever 5 and are held in place by means of the tension spring 23 connecting the closed ends of the members. The stops 24 and the fixed contacts 25 limit the movement of the members so that as the lever 5 is raised and lowered, due to the expansion and contraction of the bellows, the pivoted ends of the members 21 and 22 will pass the spring 23 which will cause the members to snap quickly from one set of stops to the other. Thus, when the bellows expands as the temperature of the cooling unit rises, the members 21 and 22 will be quickly snapped downward at the desired cut in temperature and the contact 20 will bridge the contacts 25 and close the circuit of the motor. The contacts 25 are connected in series with the refrigerator motor so that when they are bridged by the contact 20, the motor circuit will be completed and the temperature of the cooling unit is reduced by the operation of the refrigerating apparatus. As the temperature of the cooling unit falls, the bellows reduces in volume, thus lowering the pivoted ends of the members 21 and 22 below the spring 23 whereupon the spring tension will quickly raise the members 21 and 22 at the desired cut out temperature and open the motor circuit. Thus, the normal cycles of operation of the refrigerating apparatus will be produced by alternate operations of opening and closing the circuit of the motor.

The usual or normal refrigerating cycles maintained are produced within a relatively small differential between the cut in and cut out temperatures. The range of operations of the apparatus may be raised and lowered by adjusting the tension of the spring 8 which adjusts the pressures within the bellows at which the switch is opened and closed.

In order to lower the temperatures of the cooling unit sufficiently to enable fast freezing of food materials as is frequently desired by the user of the refrigerator, it is necessary to very materially reduce the pressure on the bellows so that a relatively low gas pressure will be sufficient to lower the cut out temperature and maintain the switch closed. This causes continued operation of the refrigerating apparatus and produces a marked low temperature in the cooling unit before the gas pressure in the bellows is sufficiently reduced to allow the bellows to open the switch.

Also, to raise the cut out temperature of the cooling unit to produce defrosting of the unit, the bellows must be subjected to an abnormally high pressure so that the switch will not be closed until a defrosting temperature is reached in the cooling unit which will produce a pressure in the bellows sufficiently great to overcome the abnormal bellows load and close the switch.

The defrosting temperature limit is necessarily sufficiently high that the frost collected in the cooling unit during the normal or fast freezing operations of the apparatus will be completely melted and discharged from the unit before freezing temperatures are again produced.

In the form of construction shown, I have provided a control member 28 that may be manually operated by means of a finger 29 that protrudes through the wall of the shell 11. The control member 28 is provided with a wedge shaped lug 30 that is adapted to engage in notches 31, 32, or 33 formed in the lever 34, according to the position which the control member 28 is turned. The lever 34 is pivotally supported on the wall of the shell 11 and is biased downward by the spring 35 so that when the wedge shaped lug 30 is engaged in either of the notches 31 or 33, its movement to the center notch 32 will be yieldingly resisted by the lever. The resistance to such rotation of the lug 30 may be adjusted by varying the tension of the spring 35 by means of the adjusting screw 36 located in a bracket 37 extending interiorly from the wall of the shell 11.

The yoke 26 is provided with a finger 40 and the member 28 is provided with a recess 41 into which the finger 40 protrudes. The recess 41 has a width and depth sufficient to permit considerable free play of the finger 40 within the recess as the lever 5 is raised and lowered to open and close the switch to produce normal refrigerating operations of the apparatus, but is sufficiently limited in width so that when the member 28 is moved to the right and into the position shown in Fig. 2, the lower side of the recess 41 will engage the finger 40, and the edge of the lug 30 will be located in the notch 33 and yieldingly held therein by the pressure of the lever 34. When the member is thus positioned, the switch will be closed if it is in the open position, but if it is already in the closed position, it will be yieldingly held closed by the member 28. Before the switch is again opened, the refrigerating operation of the apparatus is abnormally extended which will produce fast freezing of articles placed in proximity to the cooling unit, whereupon, due to the low pressure produced in the bellows, the lever 5 is lowered, and the finger 40 rotates the member 28 to the vertical position, and the lug 30 is moved from the notch 33 to the notch 32 where it is yieldingly held in its vertical or normal position to maintain the member 28 in the normal position. The force required to return the member 28 to the vertical position must be provided by the spring 8 and, consequently, the resisting force of the spring 8 on the bellows will be reduced by an amount equal to the resistance exerted by the spring 35 against the return movement of the member 28 so that a relatively low pressure in the bellows will be required to open the switch.

Thus the operation of the refrigerating apparatus is maintained until a pressure below the pressures normally required to open the switch is produced in the bellows before the switch will be opened and the normal operation of the refrigerating apparatus will be restored by the return of the member 28 to its normal position.

When it is desired to produce defrosting of the cooling unit, the member 28 is moved to the left as shown in Fig. 3, and the upper edge of the recess will engage the finger 40, and, if the switch should be closed, the lever 5 will be depressed by the member to open the switch. The lug 30 will engage in the notch 31 and the member will be held in this position by the spring 35 to yieldingly hold the switch open. When the member is in this position, the switch will remain open until the finger 40 is raised to rotate the member 28 to its vertical or normal position. Such rotation will be resisted by the pressure of the spring 35 on the lever 34, which coacts with the tension of the spring 8 to counteract the pressure within the bellows and, consequently, a higher pressure and temperature will be required in the cooling unit to enable the bellows to expand and raise the finger 40 and close the switch.

By the adjustment of the spring 35, the temperature of the cooling unit may be caused to rise sufficiently to enable the conversion of the ice and frost on the unit to water and its discharge from the cooling unit after the switch has been closed.

When the member 28 is returned to its vertical position the lug 30 engages the notch 31 so that the lever 28 will be held out of engagement with the finger 40 and the normal refrigerating temperatures will be restored in the cooling unit.

I claim:

1. In a thermostatic device, a switch for opening and closing an electric circuit, a heat responsive member for operating the switch in response to temperature variations, adjustable means for regulating the temperature at which the switch is opened and closed, an element including means for modifying the first named means to raise the temperature at which said switch is closed above the switch closing temperatures established by said adjustable temperature regulating means and means for modifying the first named means to lower the temperature at which said switch is opened below the switch opening temperatures established by said adjustable regulating means, a member for operating said element for rendering either of the said modifying means operative and means whereby the modifying means rendered operative by the last named means is automatically rendered inoperative upon completion of the operation of the modifying means.

2. In a thermo-responsive switch having a thermic means for opening and closing the switch, an adjusting means for adjusting the first named means to produce operations of the switch within a selected normal limited range of temperatures, a modifying means for modifying the operation of the first named means to selectively produce either a lower switch operating temperature than the said normal range of temperatures or a higher temperature than the said normal range of temperatures, and automatic means for rendering the modifying means inoperative and for restoring the operation of the adjusting means.

3. In a thermo-responsive switch, a thermic means for periodically operating the switch to alternately open and close the switch, an adjusting means for producing closing and opening of the switch at substantially predetermined temperatures, means for modifying the operation of the first named means to extend the period during which the switch is open to produce a closing temperature above that at which the first named means is set and for producing an extended period in which the switch is closed to produce an opening temperature below that at which the first named means is set, and automatic means for discontinuing the operation of the modifying means.

4. In a thermo-responsive switch having a thermic means for opening and closing the switch, an adjusting means for adjusting the first named means to produce operations of the switch within a limited normal temperature range, a modifying means operable independently of the said adjusting means for modifying the operation of the first named means to selectively produce a lower switch operating temperature than the temperatures of the said normal temperature range and a higher temperature than the temperatures of the said normal temperature range, and automatic means for rendering the modifying means inoperative and for restoring the operation of the adjusting means.

5. In a switch, a fluid pressure means for operating the switch according to temperatures, an adjustable member having means for varying the temperatures at which the said switch is opened and closed, an element operable independently of the said member and having means controlled by the said element for raising the temperature at which the said switch is closed and for lowering the temperature at which the said switch is opened, and means for automatically restoring the control of the switch to the said adjustable member and for rendering the said element controlled means inoperative upon opening or closing of the switch by the element controlled means.

6. In a thermo-responsive switch having means for opening and closing the switch, an adjusting means for adjusting the first named means to produce operations of the switch at desired temperatures, a movable element having a modifying means for modifying the operation of the first named means to selectively produce either a lower switch operating temperature than that at which the adjusting means is set or a higher temperature than that at which the adjusting means is set when the element is moved from a normal position to either of two other positions, and automatic means for rendering the said modifying means inoperative and for restoring the operation of the first named means as adjusted by the adjusting means and the element to its normal position.

7. In a switch, a thermo-responsive pressure means for opening and closing the switch, an adjusting means for adjusting the pressure means to produce operations of the switch at desired pressures, a modifying means operable independently of the said adjusting means for modifying the operation of the pressure means to selectively produce either a lower switch operating pressure by the first named means than that at which the adjusting means is set or a higher switch operating pressure than that at which the adjusting means is set, and automatic means for rendering the said modifying means inoperative and for restoring the operation of the adjusting means.

8. In a thermo-responsive switch, a heat responsive means for operating the switch, an adjustable means for regulating the temperature at which the switch is opened and closed by the heat responsive means, an element having associated therewith means for modifying the heat responsive means either to raise the temperature at which the switch is closed, or to lower the temperature at which the switch is opened, the said element independently operable with respect to the adjustable means, and automatic means for restoring the switch to the control of the adjusting means and rendering the modifying means inoperative.

9. In a thermo-responsive switch, a thermically operated member, a switch operating member operated by the thermically operated member, means for adjusting the thermically operated member to produce desired switch opening and closing temperatures, a movable element normally disengaged from the switch operating member, a yieldingly resisting means for resisting the movement of the element, the element and the switch operating member having means for connecting the element and the switch operating member for resisting the closing of the switch when the element is in one position and to resist the opening of the switch when the element is in another position.

10. In a thermo-responsive switch, means for operating the switch to produce desired normal switch opening and closing temperatures, means for raising the switch closing temperature above the normal temperatures, means for lowering the switch opening temperature below the normal temperatures, an element for selectively rendering either of the second and third named means operative, and automatic means for rendering either of the second and third named means inoperative upon closing of the switch by the second named means or upon opening of the switch by the third named means.

11. In a thermo-responsive switch, a heat responsive member for operating the switch in response to temperature variations, adjustable means for adjusting the heat responsive member to adjust the temperatures at which the switch is opened and closed, means for modifying the operation of the heat responsive member as affected by the adjustable means to raise the temperature at which the switch is closed above that at which it is set by the said adjustable means, means for modifying the operation of the heat responsive member as affected by the adjustable means to lower the temperature at which the said switch is opened below the temperature at which the said adjustable means is set to open the switch, an element for selectively rendering either of the said modifying means operative, and automatic means for rendering inoperative the modifying means rendered operative by the element upon completion of the operation of the switch by the modifying means.

12. In a thermo-responsive switch, a fluid pressure means for operating the switch according to temperatures, an adjusting means for adjusting the switch operating temperatures, a yielding resistance means, means for operatively connecting the resistance means to the pressure means for raising the switch closing temperature, and means for operatively connecting the resistance means to the pressure means for lowering the switch opening temperature, and automatic means for disconnecting the resistance means upon completion of the operation of the switch as affected by the resistance means.

13. In a thermo-responsive switch, a fluid pressure means for operating the switch according to temperatures, an adjusting means for adjusting the pressure means to adjust the switch operating temperatures, a yielding resistance means, a movable element for operatively connecting the yielding resistance means to the pressure means for raising the switch closing temperature when located in one position and for lowering the switch opening temperature when located in another position, and automatic means for operating the element to disconnect the yielding resistance means from the pressure means upon completion of the switch operation as affected by the yielding resistance means.

14. In a thermo-responsive switch, a fluid pressure means responsive to temperatures and operative to open and close the switch, a counteracting pressure means for counteracting the pressure of the fluid pressure means, and means for adjusting the said counteracting pressure means to selectively produce opening and closing of the switch at desired temperatures, a resistance means, a movable element for operatively connecting the resistance means to the counteracting pressure means for increasing the pressure of the counteracting pressure means on the fluid pressure means when the element is in one position for producing switch opening temperatures above the normal range and for decreasing the counteracting pressure on the fluid pressure means when the element is in another position for producing the switch opening temperature below the said normal temperatures.

15. In a switch, a thermo-pressure member for operating the switch, a counteracting pressure means for counteracting the operation of the thermo-pressure member, an adjusting means for adjusting the pressure of the counteracting pressure means, a switch operating member for opening and closing the switch and operated by the thermo-pressure member, a yieldingly resisting means, a movable element operative to connect the resisting means to the switch operating member for raising the switch closing temperature when the element is in one connected position and to resist the opening of the switch for lowering the switch opening temperature when the element is in another connected position.

ALBERT OAKLEY GROOMS.